United States Patent
Yasuda et al.

(10) Patent No.: US 12,517,019 B2
(45) Date of Patent: Jan. 6, 2026

(54) DILUTION GAS MIXING UNIT AND EXHAUST GAS ANALYSIS SYSTEM

(71) Applicant: HORIBA, LTD., Kyoto (JP)

(72) Inventors: Masaaki Yasuda, Kyoto (JP); Hiromitsu Izumi, Kyoto (JP); Takeshi Kimura, Kyoto (JP); Masahiro Higuchi, Kyoto (JP)

(73) Assignee: HORIBA, LTD. (JP)

( * ) Notice: Subject to any disclaimer, the term of this patent is extended or adjusted under 35 U.S.C. 154(b) by 481 days.

(21) Appl. No.: 17/928,532

(22) PCT Filed: Jul. 1, 2021

(86) PCT No.: PCT/JP2021/024975
§ 371 (c)(1),
(2) Date: Nov. 29, 2022

(87) PCT Pub. No.: WO2022/019082
PCT Pub. Date: Jan. 27, 2022

(65) Prior Publication Data
US 2023/0204475 A1 Jun. 29, 2023

(30) Foreign Application Priority Data
Jul. 22, 2020 (JP) .............................. 2020-125320

(51) Int. Cl.
*G01N 1/38* (2006.01)
*B01F 23/10* (2022.01)
(Continued)

(52) U.S. Cl.
CPC ............. *G01N 1/38* (2013.01); *B01F 23/191* (2022.01); *G01M 15/102* (2013.01);
(Continued)

(58) Field of Classification Search
CPC .................. G01N 1/38; G01N 1/2252; G01N 2001/2255; B01F 23/191; G01M 15/102; F01N 2240/20; F01N 2270/00
See application file for complete search history.

(56) References Cited

U.S. PATENT DOCUMENTS

| | | | | |
|---|---|---|---|---|
| 3,817,100 A | * | 6/1974 | Anderson | G01F 1/00 73/864.34 |
| 2014/0338426 A1 | * | 11/2014 | Noda | G01N 1/26 73/40 |

(Continued)

FOREIGN PATENT DOCUMENTS

| JP | 03-129184 A | 6/1991 |
|---|---|---|
| JP | 08-028718 A | 2/1996 |

(Continued)

OTHER PUBLICATIONS

International Search Report dated Sep. 21, 2021 issued for International application No. PCT/JP2021/024975.

*Primary Examiner* — Ryan D Walsh
(74) *Attorney, Agent, or Firm* — Brooks Kushman P.C.

(57) ABSTRACT

A dilution gas mixing unit that is used in an exhaust gas analysis system that analyzes the mixed gas obtained by diluting an exhaust gas with the dilution gas, and mixes the dilution gas with the exhaust gas is provided with a dilution gas supply pipe that is connected to an exhaust gas introduction pipe into which the exhaust gas is introduced and supplies the dilution gas to the exhaust gas introduction pipe, a dilution gas sampling unit that is provided in the dilution gas supply pipe and collects the dilution gas, and a backflow prevention member that is provided closer to the exhaust gas introduction pipe than the dilution gas sampling unit in the dilution gas supply pipe and prevents the mixed gas from flowing backward through the dilution gas supply pipe.

10 Claims, 7 Drawing Sheets

(51) Int. Cl.
*G01M 15/10* (2006.01)
*G01N 1/22* (2006.01)

(52) U.S. Cl.
CPC ........ *G01N 1/2252* (2013.01); *F01N 2240/20* (2013.01); *F01N 2270/00* (2013.01); *G01N 2001/2255* (2013.01)

(56) References Cited

U.S. PATENT DOCUMENTS

2014/0352404 A1* 12/2014 Kumagai ............. G01N 1/2247
  73/23.31
2017/0343462 A1* 11/2017 Tokuhira .............. B01D 46/442

FOREIGN PATENT DOCUMENTS

| | | |
|---|---|---|
| JP | 2010-139340 A | 6/2010 |
| JP | 2010-185837 A | 8/2010 |
| JP | 2011-106999 A | 6/2011 |
| KR | 10-2016-0064796 | 6/2016 |

* cited by examiner

DILUTION GAS MIXING UNIT AND EXHAUST GAS ANALYSIS SYSTEM

CROSS-REFERENCE TO RELATED APPLICATIONS

This application is the U.S. national phase of PCT Application No. PCT/JP2021/024975, filed Jul. 1, 2021, which claims priority to Japanese Patent Application No. 2020-125320, filed Jul. 22, 2020, the disclosures of which are incorporated in their entirety by reference herein.

TECHNICAL FIELD

The present invention relates to a dilution gas mixing unit and an exhaust gas analysis system.

BACKGROUND ART

A conventional exhaust gas analysis system includes an exhaust gas introduction pipe into which an exhaust gas is introduced, and a dilution gas supply pipe connected to the exhaust gas introduction pipe to supply a dilution gas (Patent Literature 1). With this configuration, the exhaust gas is analyzed by collecting a mixed gas obtained by diluting the exhaust gas with a dilution gas, collecting the dilution gas, and tot example, subtracting the concentration of a component to be measured contained in the collected dilution gas from the concentration of the component to be measured contained in the collected mixed gas as a background value.

In recent years, the concentration of various components contained in the exhaust gas has been reduced, and compared to before it is necessary to lower a dilution ratio in order to ensure the analysis accuracy for the exhaust gas.

However, when the dilution ratio is lowered in the exhaust gas analysis system described above, a dilution gas flow rate is lowered. Therefore, for example, in a case where an exhaust gas flow rate rapidly fluctuates due to the rotation control of an engine, a problem may occur wherein a part of the diluted exhaust gas (mixed gas) flows up to the dilution gas supply pipe, and a component contained in the mixed gas affects background measurement.

CITATION LIST

Patent Literature

Patent Literature 1: JP 2010-139340 A

SUMMARY OF INVENTION

Technical Problem

Therefore, a main object of the present invention is to reduce the influence of the blowing-up of the mixed gas on the background measurement even when the dilution ratio is lowered and the dilution gas flow rate drops.

Solution to Problem

That is, a dilution gas mixing unit according to the present invention is a dilution gas mixing unit that is used in an exhaust gas analysis system for analyzing a mixed gas obtained by diluting an exhaust gas pith a dilution gas, and mixes the dilution gas with the exhaust gas, and the dilution gas mixing unit includes: a dilution gas supply pipe that is connected to an exhaust gas introduction pipe into which the exhaust gas is introduced, and supplies a dilution gas to the exhaust gas introduction pipe; a dilution gas sampling unit that is provided in the dilution gas supply pipe and collects the dilution gas; and a backflow prevention member provided closer to the exhaust gas introduction pipe than the dilution gas sampling unit in the dilution gas supply pipe to prevent the mixed gas from flowing backward in the dilution gas supply pipe.

According to the dilution gas mixing unit configured as described above, since the backflow prevention member provided closer to the exhaust gas introduction pipe than the dilution gas sampling unit in the dilution gas supply pipe, even if a dilution ratio is lowered and a flow rate of the dilution gas drops, and as a result, part of the mixed gas blows up into the dilution gas supply pipe, the mixed gas collides with the backflow prevention member and is pushed back by the dilution gas, and is less likely to flow backward through the dilution gas supply pipe. As a result, it is possible to make it difficult for the blown-up mixed gas to reach the dilution gas sampling unit, and it is possible to reduce the influence of the mixed gas on the background measurement.

When the mixed gas blows up, the mixed gas tends to flow along an inner peripheral surface of the dilution gas supply pipe. In view of this, it is preferable that the backflow prevention member includes a through hole through which the dilution gas passes, and is provided along the inner peripheral surface of the dilution gas supply pipe.

In this case, since the backflow prevention member is provided along the inner peripheral surface of the dilution gas supply pipe, the blown-up mixed gas can more reliably collide with the backflow prevention member.

As a specific aspect of the backflow prevention member, an orifice plate can be exemplified.

When the above-mentioned orifice plate with one through hole is used, the dilution gas passing through the through hole is less likely to go around to a back side of the orifice plate, and the dilution gas stagnates on the back side. This stagnation is particularly noticeable when the dilution gas flow rate is in a low flow rate range.

As a result, on a downstream side of the orifice plate, the dilution gas that has passed through the through hole flows without delay in a central part in the dilution gas supply pipe, while the dilution gas stagnates in the vicinity of the inner peripheral surface in the dilution gas supply pipe, and due to this, the uniformity of an exhaust gas component contained in the mixed gas is reduced, and consequently the reproducibility of an analysis result is reduced.

Note that, by expanding the through hole, a region on the back side of the orifice plate is narrowed, and the dilution gas is less likely to stagnate, but in this case, the backflow prevention effect by the orifice plate is impaired.

Therefore, in order to improve the uniformity of the exhaust gas component contained in the mixed gas while securing the backflow prevention effect, the backflow prevention member is preferably a porous orifice plate provided with a large number of the through holes.

With such a configuration, since the dilution gas is straightened by a large number of the through holes, the dilution gas can be caused to flow smoothly on the downstream side of the porous orifice plate. This makes it possible to improve the uniformity of the exhaust gas component contained in the mixed gas while securing the backflow prevention effect.

As the through hole of the porous orifice plate is made smaller, the flow velocity of the diluted exhaust gas passing through the through hole increases, so that the backflow prevention effect can be improved, but in the analysis specification in which the flow rate of the dilution gas is large, a pressure loss may become too large to use.

Therefore, it is preferable that a plurality of the porous orifice plates are provided along a flow direction of the dilution gats in the dilution gas supply pipe.

In this case, by using the plurality of porous orifice plates having different through hole sizes, it is possible to appropriately adjust the backflow prevention effect and the pressure loss according to various analysis specifications having different dilution gas flow rates.

As a more specific embodiment, it is preferable that the through holes of the porous orifice plates on the downstream side are smaller than the through holes of the porous orifice plates on an upstream side.

In order to sample the dilution gas flowing toward the through hole of the backflow prevention member, it is preferable that the dilution gas sampling unit includes an introduction port disposed so as to be positioned in the through hole of backflow prevention member as viewed from a pipe axis direction in the dilution gas supply pipe, or so as too be positioned inside more than half of an inner diameter from a pipe axis of the dilution gas supply pipe, with the pipe axis being a center.

The introduction port preferably faces the upstream side of the dilution gas.

In this case, as compared with a case where the introduction port faces, for example, the downstream side or the side of the dilution gas, it is possible to make it for the mixed gas in a case where the blow-up occurs to reach the introduction port while collecting the dilution gas without difficulty.

Considering the influence on the exhaust gas analysis due to the provision of the backflow prevention member, the pressure loss of the dilution gas supply pipe provided with the backflow prevention member is preferably less than 250 Pa.

Furthermore, an exhaust gas analysis system according to the present invention includes: a mixed gas flow pipe through which the mixed gas flows; a mixed gas sampling unit that is provided in the mixed gas flow pipe and collects the mixed gas; a constant flow rate mechanism that sets a flow rate of the mixed gas to a constant flow rate; a gas analyzer that analyzes a predetermined component to be measured contained in the collected dilution gas and the collected mixed gas; and a dilution gas mixing unit mentioned above.

Also in the exhaust gas analysis system configured as described above, the same operational effects as those of the above-described dilution gas mixing unit can be achieved.

Advantageous Effects of Invention

According to the present invention configured described above, even in a case where the dilution ratio is lowered and the dilution gas flow ate drops, it is possible to reduce the influence of the blowing-up of the mixed gas on the background measurement.

REFERENCE SIGNS LIST

100 exhaust gas analysis system
X dilution gas mixing unit
21 exhaust gas introduction pipe
3H dilution gas supply pipe
250 dilution gas sampling unit
P introduction port
5 backflow prevention member
5a through hole

DESCRIPTION OF EMBODIMENTS

Hereinafter, an embodiment of an exhaust analysis system using a dilution gas mixing unit according to the present invention will lie described with reference the drawings.

An exhaust gas analysis system 100 according to the present embodiment is of a dilution sampling type, and dilutes an exhaust gas collected from a test vehicle 200 with dilution air as a dilution gas to perform concentration measurement. Hereinafter, in the present embodiment an exhaust gas analysis system with a constant plume dilution sampling method will be described in which an entire amount of exhaust gas is sampled and diluted with dilution air to have a constant known flow rate.

Note that examples of the test vehicle 200 include an engine vehicle, a hybrid vehicle, and a fuel cell vehicle.

Figure 1:
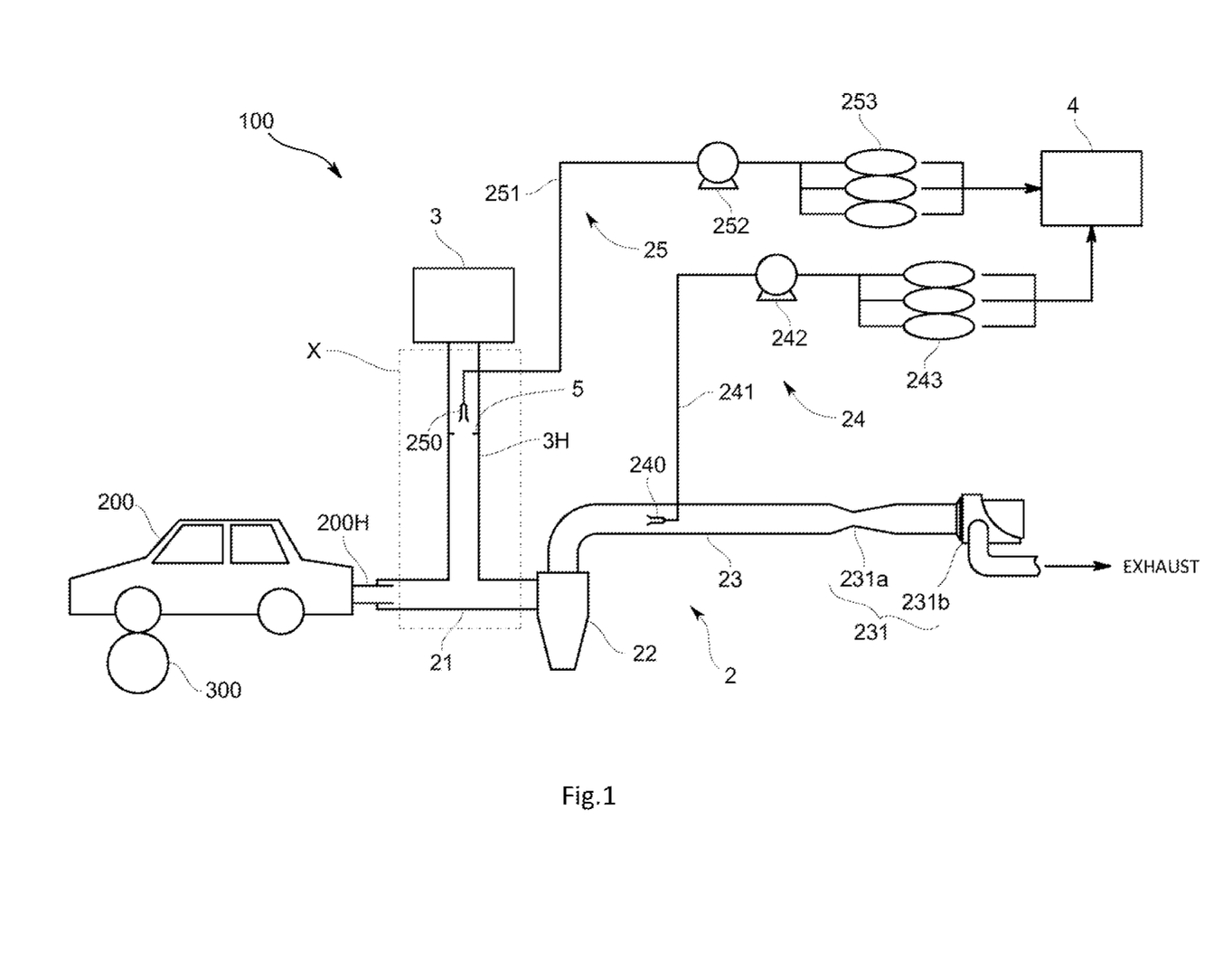
FIG. 1 is a schematic diagram illustrating an overall configuration of an exhaust gas analysis system according to an embodiment of the present invention.

Specifically, as illustrated in FIG. 1, this includes a constant volume sampling device 2 that introduces the entire amount of exhaust gas and dilution air into the device, controls a total flow rate of the exhaust is and the dilution air so as to be constant, and collects a part of the diluted exhaust gas (hereinafter, it is referred to as a mixed gas.) in a collection bag at a constant flow rate, a dilution air purification device 3 that removes impurities in the atmosphere and supplies the purified dilution air to the constant volume sampling device 2, and a gas analyzer 4 that analyzes the concentration of a predetermined component (for example, HC, CO, $H_2O$, $N_2O$, or the like) in the mixed gas collected by the collection bag of the constant volume sampling device 2.

The constant volume sampling device 2 includes an exhaust gas introduction pipe 21 connected to an exhaust pipe 200H of the test vehicle 200 mounted on a chassis dynamometer 300, a dilution gas supply pipe 3H connected to the exhaust gas introduction pipe 21 and supplying a dilution gas, a mixed gas flow pipe 23 provided with a constant flow rate mechanism 231 for setting a flow rate of the mixed constant flow rate, a mixed gas collection line 24 for collecting the mixed gas flowing through the mixed gas flow pipe 23, and a dilution gas collection line 25 for collecting dilution air flowing through the dilution gas supply pipe 3H. Furthermore, a cyclone 22 for removing dust contained in the mixed gas may be provided downstream of the exhaust gas introduction pipe 21. Note that the constant volume sampling device 2 does not necessarily sample the exhaust gas of the test vehicle 200 mounted on the chassis dynamometer 3, and may sample, for example, an exhaust gas from an engine connected to an engine dynamometer or an exhaust gas from a power train connected to one or a plurality of dynamometers.

The constant flow rate mechanism 231 includes a Venturi tube 231a provided on the mixed gas flow pipe 23 and a turboblower 231b provided do stream of the Venturi tube 231a.

The mixed gas collection line 24 includes a mixed gas sampling unit 240 in the mixed gas flow pipe 23, a mixed gas collection pipe 241 having one end connected to the mixed gas sampling unit, a mixed gas collection pump 242 provided on the mixed gas collection pipe 241, and a mixed gas bag 243 that stores the mixed gas collected by the mixed gas collection pump 242. Note that the mixed gas collection pipe 241 is provided on an upstream side of the constant flow rate mechanism 231.

Furthermore, the dilution gas collection line 25 includes a dilution gas sampling unit 250 provided in the dilution gas supply pipe 3H, a dilution gas collection pipe 251 connected to the dilution gas sampling unit 250, a dilution gas collection pump 252 provided on the dilution gas collection pipe 251, and a dilution gas bag 253 that stores dilution air collected by the dilution gas collection pump 252.

Then, so-called bag measurement is performed by the gas analyzer 4 using the mixed gas bag 243 of the mixed gas collection line 24 and the dilution gas bag 25 of the dilution gas collection line 25.

The dilution air purification device 3 purifies dilution air from the atmosphere, and removes at least any of CO, HC, $NO_x$, and $N_2O$ in the dilution air in order to stabilize a low concentration of a background in exhaust gas analysis. Furthermore, in the dilution air purification device 3, a method of removing CO, HC, NO, $N_2O$, and the like is to convert CO, HC, NO, and $N_2O$ in the dilution air into $CO_2$, $H_2O$, $N_2$, and $NO_2$, and to adsorb $NO_2$ generated by oxidation of NO and $N_2O$ with an $NO_x$ adsorbent.

Here, the exhaust gas analysis system 100 of the present embodiment has a feature in a region surrounded by a broken line FIG. 1, and specifically has a feature in a dilution gas mixing unit X in which the exhaust gas and the dilution gas are mixed. Therefore, this dilution gas mixing unit will be described in detail below.

Figure 2:
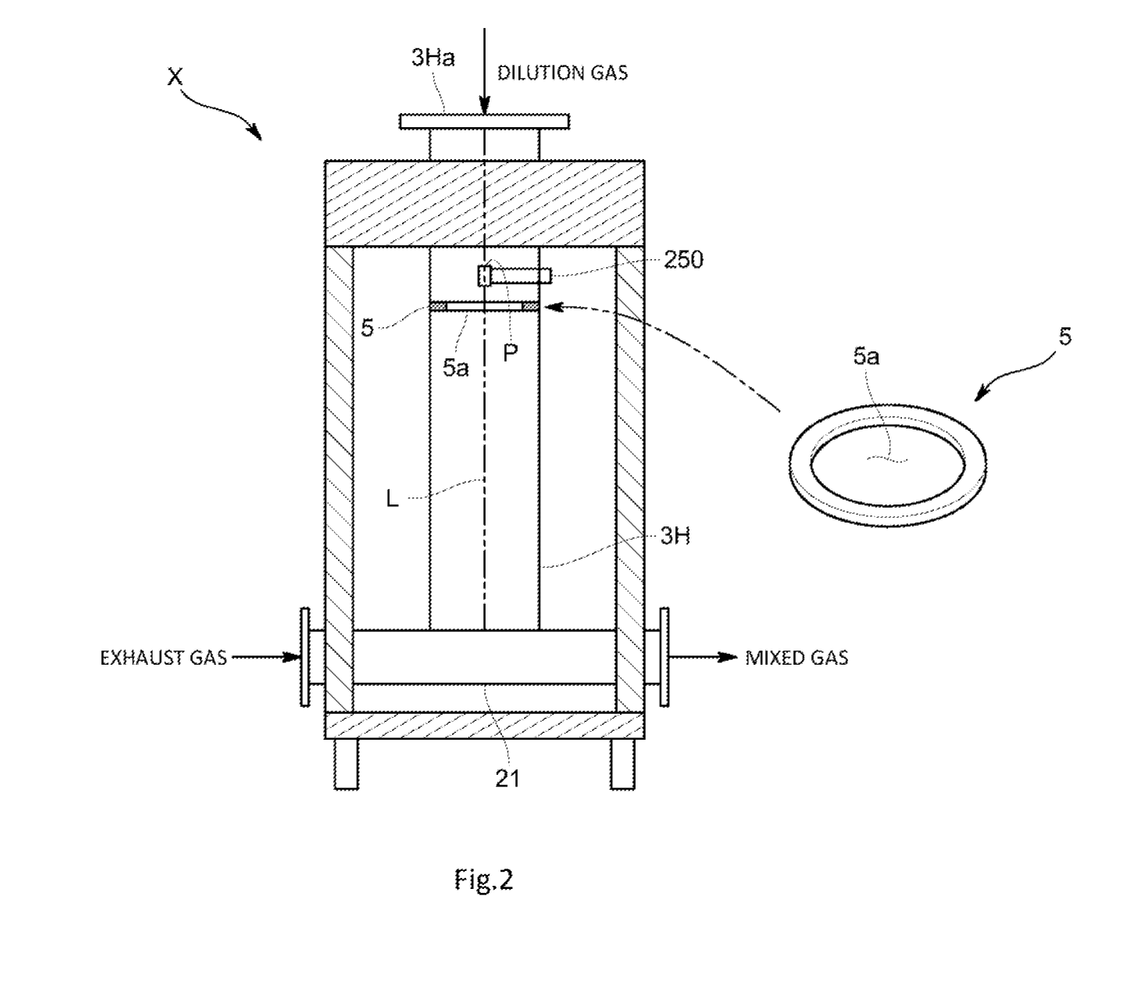
FIG. 2 is a schematic diagram illustrating a configuration of a dilution gas mixing unit of the embodiment.

As illustrated in FIGS. 1 and 2, the dilution gas mixing unit X of the present embodiment includes at least the above-mentioned dilution gas supply pipe 3H and the dilution gas sampling unit 250 provided in the dilution supply pipe 3H, and also includes at least a part of the exhaust gas introduction pipe 21.

The dilution gas sampling unit 250 of the present embodiment is provided in the dilution gas supply pipe 3H and has an introduction port P facing an upstream side of the dilution gas.

More specifically, the introduction port P is disposed such that a pipe axis L of the dilution gas supply pipe 3H passes through the introduction port. Here, the introduction port is disposed such that the pipe axis L passes through a center of the introduction port P or the vicinity thereof.

Furthermore, the introduction port P of this embodiment is provided at a position closer to an upstream opening 3Ha of the dilution gas supply pipe 3H than the exhaust gas introduction pipe 21 in a pipe axis direction of the dilution gas supply pipe 3H.

Note that the introduction port P mentioned above may face a downstream side of the dilution gas, may face a side (a radial direction of the dilution gas supply pipe 3H), or may be provided at a position closer to the exhaust gas introduction pipe 21 than the upstream opening 3Ha of the dilution gas supply pipe 3H.

However, the dilution gas mixing unit X further includes a backflow prevention member 5 provided closer to the exhaust gas introduction pipe 21 than the dilution gas sampling unit 250 in the dilution gas supply pipe 3H to prevent the mixed gas from flowing backward through the dilution gas supply pipe 3H.

The backflow prevention member 5 has a through hole 5a through which the dilution gas passes. The backflow prevention member 5 of the present embodiment is, for example, an annular member having a flat plate shape, and is specifically an orifice plate. In this embodiment, the introduction port P of the dilution gas sampling unit 200 mentioned above is disposed inside the through hole 5a of the backflow prevention member 5. Note that a size of the through hole 5a is such that a pressure loss of the dilution gas flowing through the dilution gas supply pipe 3H does not affect the analysis accuracy of the exhaust gas analysis, and specifically, the pressure loss in the dilution gas supply pipe 3H provided with the backflow prevention member 5 is less than 250 Pa.

The backflow prevention member 5 is provided along an inner peripheral surface of the dilution gas supply pipe 3H, in other words, at least a part of an outer peripheral surface of the backflow prevention member 5 is in contact with at least a part of the inner peripheral surface of the dilution gas supply pipe 3H.

In this embodiment, the backflow prevention member 5 is provided over an entire circumference of the inner peripheral surface of the dilution gas supply pipe 3H, in other words, an entire circumference of the outer peripheral surface of the backflow prevention member 5 is in contact with an entire circumference or the inner peripheral surface of the dilution gas supply pipe 3H.

Note that the backflow prevention member 5 is not necessarily provided over the entire circumference of the inner peripheral surface of the dilution gas supply pipe 3H, and may be provided continuously or intermittently on a part of the inner peripheral surface of the dilution gas supply pipe 3H.

Furthermore, the backflow prevention member 5 is provided at a position closer to the exhaust gas introduction pipe 21 than the introduction port P and closer to the upstream opening 3Ha of the dilution gas supply pipe 3H than the exhaust gas introduction pipe 21 in the pipe axis direction of the dilution gas supply pipe 3H. However, the backflow prevention member 5 may be provided at a position closer to the exhaust gas introduction pipe 21 than the upstream opening 3Ha of the dilution gas supply pipe 3H.

According to the exhaust gas analysis system 100 configured as described above, since the backflow prevention member 5 is provided closer to the exhaust gas introduction pipe 21 than the dilution gas sampling unit 250 in the dilution gas supply pipe 3H, even if the dilution ratio is lowered and the flow rate of the dilution gas drops, and as a result, a part of the mixed gas is blown up into the dilution gas supply pipe 3H, the mixed gas collides with the backflow prevention member 5 and is pushed back by the dilution gas, and the backflow of the dilution gas supply pipe 3H becomes difficult. As a result, it is possible to make it difficult for the blown-up mixed gas to reach the dilution gas sampling unit 250, and it is possible to reduce the influence of the mixed gas on the background measurement.

Figure 3:
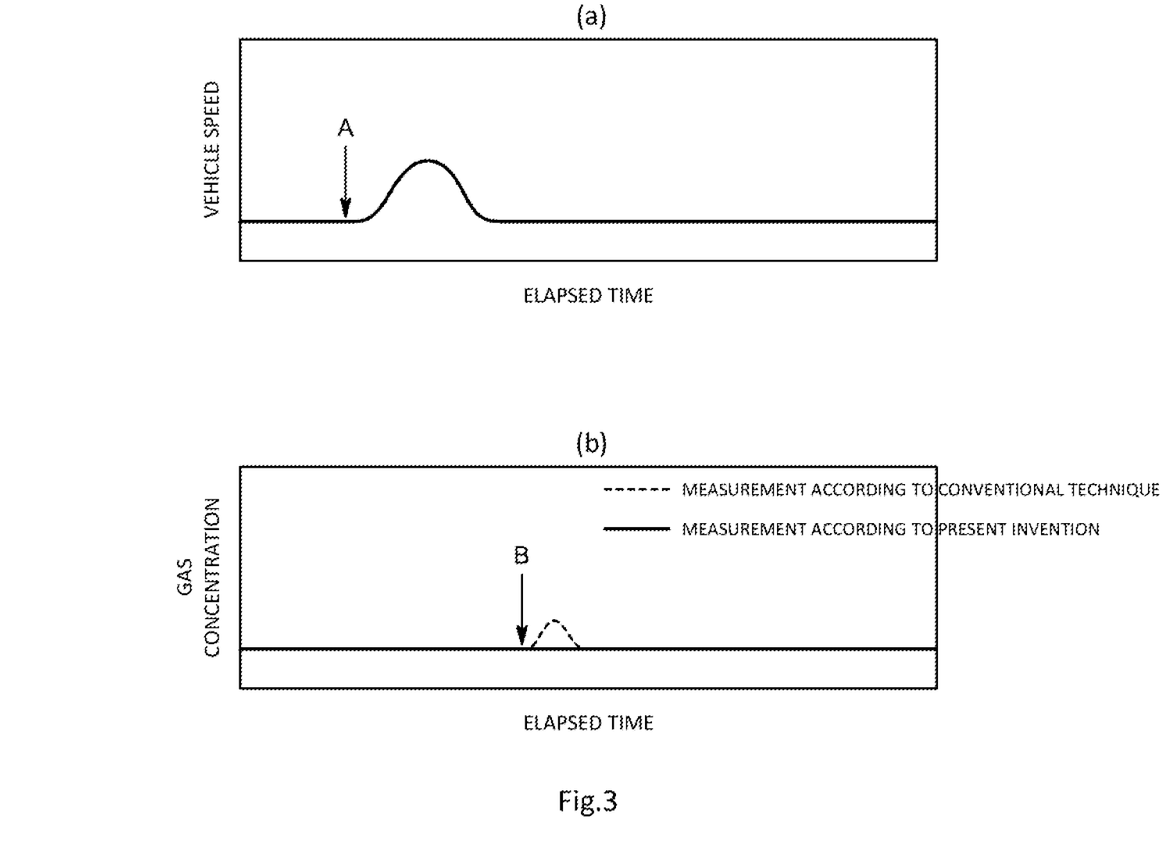
FIG. 3 is experimental data illustrating an effect of a backflow prevention member of the embodiment.

Here, in order to describe the operation and effect of the backflow prevention mender 5 according to the present invention, FIG. 3(a) illustrates a schematic graph of a vehicle speed at the time of an exhaust gas test using the test vehicle, and FIG. 3(b) illustrates a schematic graph of the concentration of $CO_2$ contained in the dilution air collected from the dilution gas sampling unit 250 at the time of the test.

When accelerator pedal of the test vehicle is depressed at a timing A in FIG. 3(a) to temporarily increase the vehicle speed, an exhaust flow rate of the exhaust gas rapidly increases, so that a flow rate balance with the dilution air temporarily changes, and a part of the mixed gas which is the exhaust gas after dilution blows up.

In the conventional technique, the blown-up mixed gas reaches the dilution gas sampling unit 250, and $CO_2$ derived from the exhaust gas contained in the mixed gas is detected, so that the gas concentration temporarily increases as illustrated at B of FIG. 3(b). The dilution gas sampling unit 250 is originally intended to measure the concentration of a measurement target component contained in the dilution gas, and the measurement of the measurement target component contained in a part of the exhaust gas as mentioned above causes a decrease in analysis accuracy.

On the other hand, when the backflow prevention member 5 according to the present invention is used, as illustrated in FIG. 3(b), it can be seen that an increase in the gas concentration does not appear, and the mixed gas can be prevented from reaching the dilution gas sampling unit 250.

Further, since the introduction port of the dilution gas sampling unit 250 of the present embodiment is provided at a position where the pipe axis L of the dilution gas supply pipe 3H passes, even if the mixed gas is blown up along an inner wall of the dilution gas supply pipe 3H, it is possible to make it difficult for the mixed gas to reach the introduction port P.

Moreover, since the flow of the dilution gas is faster in a central part of the dilution gas supply pipe 3H than in an outer peripheral part, this also makes it difficult for the mixed gas to reach the introduction port P.

Furthermore, since the backflow prevention member 5 is provided along the inner peripheral surface of the dilution gas supply pipe 3H, the blown-up mixed gas can more reliably collide with the backflow prevention member 5.

Furthermore, since the introduction port P of the dilution gas sampling 250 faces the upstream side of the dilution gas, it is possible to make it difficult for the mixed gas when the blow-up occurs to reach the introduction port P while reasonably collecting the dilution gas as compared with the case where the introduction port P faces, for example, the downstream side or the side.

In addition, since the pressure loss of the dilution gas supply pipe 3H provided with the backflow prevention member 5 is less than 250 Pa, the analysis accuracy of the exhaust gas analysis can be secured.

Note that the present invention is not limited to the above embodiment.

Figure 4:
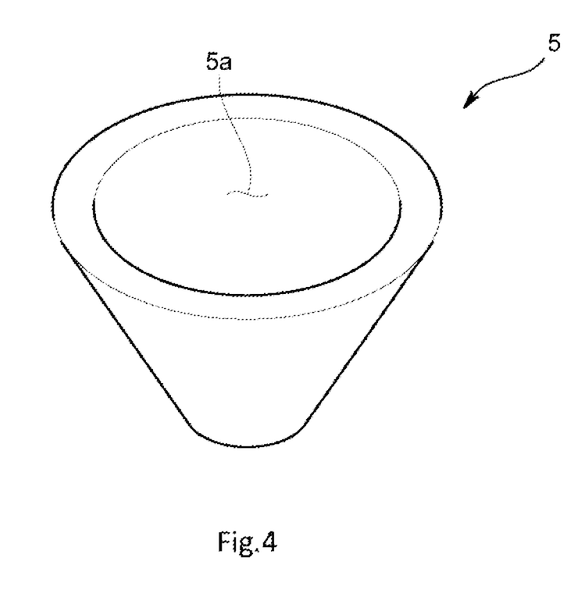
FIG. 4 is a schematic diagram illustrating a configuration of a backflow prevention member of another embodiment.

For example, the backflow prevention member 5 has an annular shape in the above embodiment, but may be a part of an annular shape such as a semi-annular shape or a partial annular shape. Moreover, the backflow prevention member 5 is not limited to a flat plate shape, and various shapes such as a truncated conical shape whose diameter decreases in a flow direction of the dilution gas may be adopted, for example, as illustrated in FIG. 4.

Furthermore, the dilution gas mixing unit X of the above embodiment includes one backflow prevention member 5, but may include a plurality of the backflow prevention member 5. In this case, the plurality backflow prevention members 5 may be provided so as to have the same position in the pipe axis direction and different positions in a circumferential direction in the dilution gas supply pipe 3H, or may be provided so as to have different positions in the pipe axis direction and different positions in the circumferential direction.

Moreover, the backflow prevention member 5 has the single through hole 5a in the above embodiment, but may have a plurality of the through holes 5a.

Figure 5:
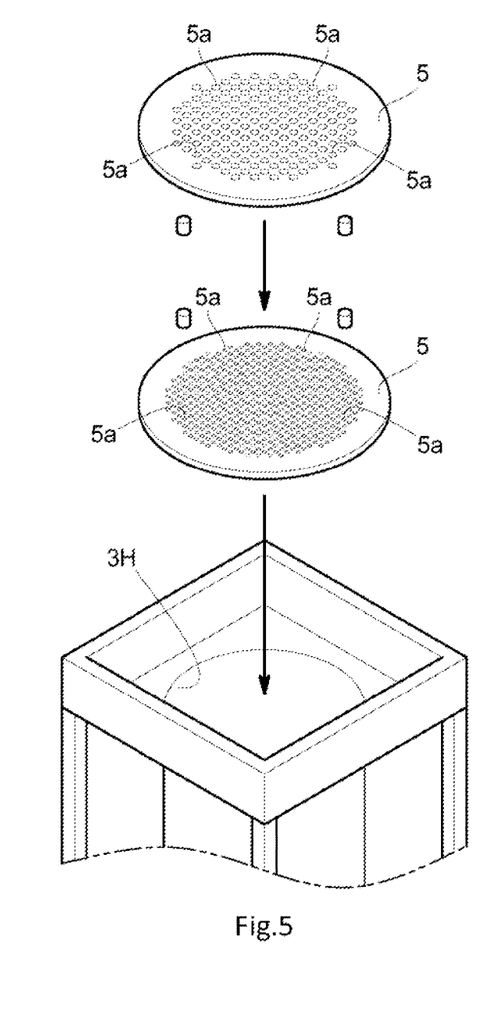
FIG. 5 is a schematic diagram illustrating a configuration of a backflow prevention member of another embodiment.

As a specific embodiment in which the plurality of through holes 5a are provided, as illustrated FIG. 5, an embodiment in which a porous orifice plate provided with a large number of the through holes 5a is used as the backflow prevention member 5 can be mentioned.

Figure 6:
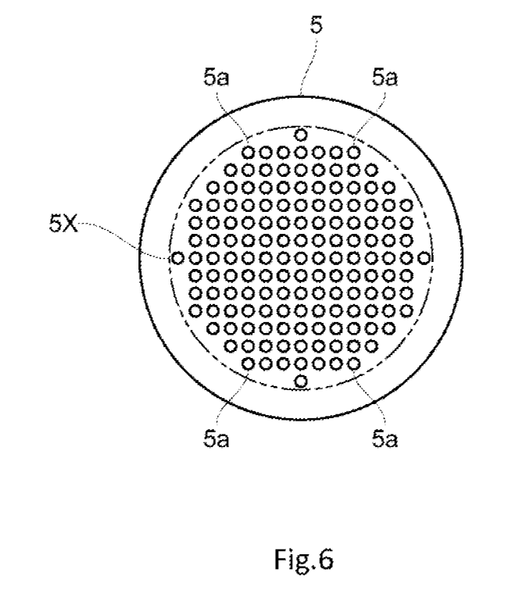
FIG. 6 is a schematic diagram illustrating a configuration of a backflow prevention member of another embodiment.

As illustrated in FIG. 6, the backflow prevention member 5 has a flat plate shape, and a through hole formation region 5X, which is a region where the through holes 5a are formed, is virtually set.

The through hole formation region 5X is, for example, a circular region, and here, has a circular shape having the same diameter dimension (diameter) as an inner diameter of the dilution gas supply pipe 3H. In the present embodiment, the through holes 5a having the same diameter are regularly arranged in the through hole formation region 5X. Note that sizes of the through holes 5a may be different between the central part and the outer peripheral part, for example, and an arrangement of the through holes 5a is not limited to that illustrated in FIG. 6 and may be appropriately changed. Furthermore, the through hole formation region 5X may have a diameter smaller than the inner diameter of the dilution gas supply pipe 3H, or may have a polygonal shape or a rectangular shape, for example, without being limited to a circular shape.

Moreover, in the configuration illustrated in FIG. 5, a plurality of porous orifice plates 5 as backflow prevention members are provided along a flow direction of the dilution gas in the dilution gas supply pipe 3H.

Here, the two porous orifice plates provided, and a spacer S is inter posed therebetween. As a result, the porous orifice plate 5 on the upstream side and the porous orifice plate 5 on the downstream side are disposed apart from each other by a thickness of the spacer S. Note that the number of porous orifice plates 5 max be one or three or more.

The porous orifice plate 5 on the upstream side and the porous orifice plate 5 on the downstream side are different from each other in the sizes of the through holes 5a formed therein. More specifically, the through holes 5a of the porous orifice plate 5 on the downstream side is smaller than the through holes 5a of the porous orifice plate 5 on the upstream side. Note that the number of the through holes 5a formed in the porous orifice plate 5 on the upstream side may be different from the number of the through holes 5a formed in the porous orifice plate 5 on the downstream side.

With such a configuration, since the dilution gas is straightened by a large number of through holes 5a, the dilution gas can flow smoothly on the downstream side of the porous orifice plates 5. This makes it possible to improve the uniformity of the exhaust gas component contained in the mixed gas while securing the backflow prevention effect by the porous orifice plates 5.

Moreover, since the porous orifice plates 5 having different sizes of the through holes 5a are used as the plurality of porous orifice plates 5, the backflow prevention effect and the pressure loss can be appropriately adjusted according to various analysis specifications having different dilution gas flow rates.

Note that, when the flow rate of the dilution gas is large, the pressure loss becomes too large when the porous orifice plate 5 is used. Therefore, in this case, the orifice plate 5 in which one through hole 5a in the above described embodiment is formed may be used, or the orifice plate 5 and the porous orifice plate 5 in the embodiment may be used in combination depending on the flow rate of the dilution gas.

The introduction port P of the dilution gas sampling unit 250 is provided in the dilution gas supply pipe 3H in the above embodiment, but may be provided in a peripheral wall of the dilution gas supply pipe 3H.

Figure 7:
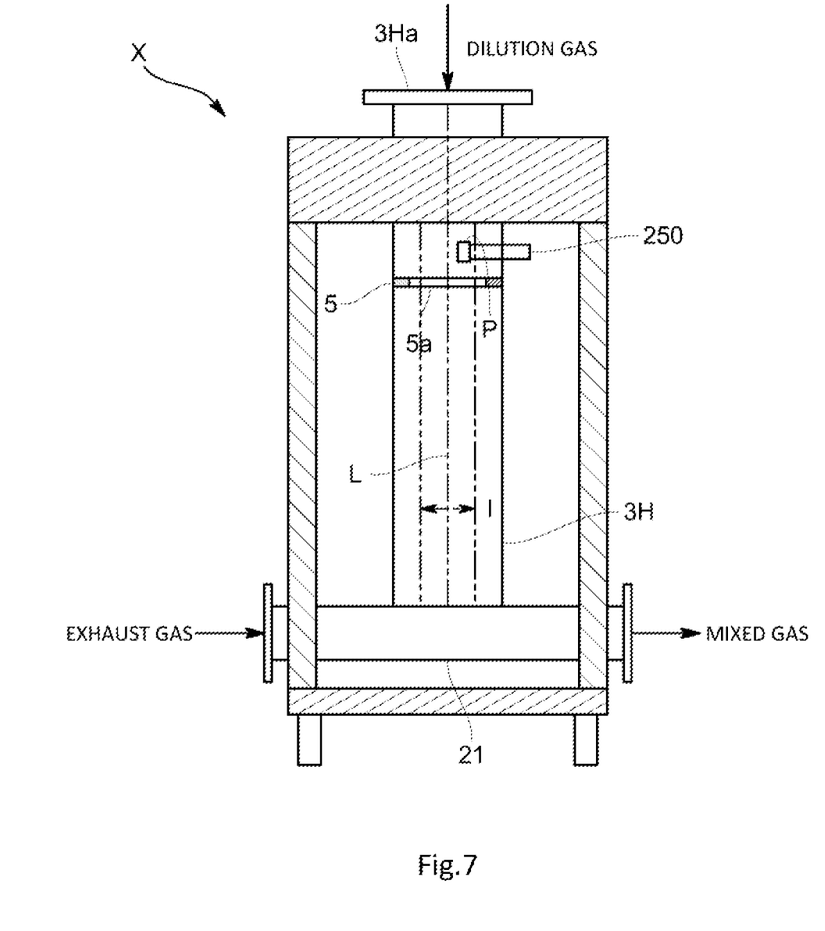
FIG. 7 is a schematic diagram illustrating a configuration of a dilution gas mixing unit of another embodiment.

Furthermore, the introduction port P may be provided at a position where the pipe axis L of the dilution gas supply pipe 3H does not pass. Note that examples of the position of the introduction port P through which the pipe axis L does not pass include a position at which the introduction port P is accommodated inside 1 of a half of the inner diameter of the dilution exhaust gas supply pipe 3H as illustrated in FIG. 7.

Furthermore, the exhaust gas analysis system 100 samples the entire amount of the exhaust gas in the above embodiment, but may sample a part of the exhaust gas.

In addition, the present invention is not limited to the above embodiment and it goes without saying that various modifications can be made without departing from the gist of the present invention.

INDUSTRIAL APPLICABILITY

According to the exhaust gas analysis system 100 of the present invention, even in a case where the dilution ratio is lowered and the dilution gas flow rate drops, it is possible to reduce the influence of the blowing-up of the mixed gas on the background measurement.

The invention claimed is:

1. A dilution gas mixing unit used in an exhaust gas analysis system that analyzes a mixed gas obtained by diluting an exhaust gas with a dilution gas, the dilution gas mixing unit mixing the dilution gas with the exhaust gas, the dilution gas mixing unit comprising:
a dilution gas supply pipe connected to an exhaust gas introduction pipe into which the exhaust gas is introduced, the dilution gas supply pipe supplying a dilution gas to the exhaust gas introduction pipe;
a dilution gas sampling unit that is provided in the dilution gas supply pipe and collects the dilution gas; and
a backflow prevention member provided downstream of the dilution gas sampling unit and upstream of the exhaust gas introduction pipe, in a flow direction of the dilution gas, to prevent the mixed gas from flowing backward in the dilution gas supply pipe, wherein the backflow prevention member includes a through hole through which the dilution gas passes, and is provided along an inner peripheral surface of the dilution gas supply pipe and wherein the dilution gas sampling unit includes an introduction port disposed so as to be positioned in the through hole as viewed from a pipe axis direction in the dilution gas supply pipe, or so as to be positioned inside more than half of an inner diameter from a pipe axis of the dilution gas supply pipe, with the pipe axis being a center.

2. The dilution gas mixing unit according to claim 1, wherein the backflow prevention member is an orifice plate.

3. The dilution gas mixing unit according to claim 1, wherein the backflow prevention member is a porous orifice plate provided with a number of through holes.

4. The dilution gas mixing unit according to claim 3, wherein a plurality of the porous orifice plates is provided along a flow direction of the dilution gas in the dilution gas supply pipe.

5. The dilution gas mixing unit according to claim 4, wherein through holes of the porous orifice plates on a downstream side are smaller than through holes of the porous orifice plates on an upstream side.

6. The dilution gas mixing unit according to claim 1, wherein the introduction port faces an upstream side of the dilution gas.

7. The dilution gas mixing unit according to claim 1, wherein a pressure loss of the dilution gas supply pipe provided with the backflow prevention member is less than 250 Pa.

8. An exhaust gas analysis system comprising:
a mixed gas flow pipe through which the mixed gas flows;
a mixed gas sampling unit that is provided in the mixed gas flow pipe and collects the mixed gas;
a constant flow rate mechanism that sets a flow rate of the mixed gas to a constant flow rate;
a gas analyzer that analyzes a predetermined component to be measured contained in the collected dilution gas and the collected mixed gas; and
a dilution gas mixing unit according to claim 1.

9. A dilution gas mixing unit used in an exhaust gas analysis system that analyzes a mixed gas obtained by diluting an exhaust gas with a dilution gas, the dilution gas mixing unit mixing the dilution gas with the exhaust gas, the dilution gas mixing unit comprising:
a dilution gas supply pipe connected to an exhaust gas introduction pipe into which the exhaust gas is introduced, the dilution gas supply pipe supplying a dilution gas to the exhaust gas introduction pipe;
a dilution gas sampling unit that is provided in the dilution gas supply pipe and collects the dilution gas; and
a backflow prevention member provided downstream of the dilution gas sampling unit and upstream of the exhaust gas introduction pipe, in a flow direction of the dilution gas, to prevent the mixed gas from flowing backward in the dilution gas supply pipe, wherein the backflow prevention member defines a through hole through which the dilution gas passes, and is provided along an inner peripheral surface of the dilution gas supply pipe.

10. The dilution gas mixing unit of claim 9, wherein the through hole is non-closable.

* * * * *